(12) United States Patent
Sekino et al.

(10) Patent No.: US 10,144,369 B2
(45) Date of Patent: Dec. 4, 2018

(54) CURVATURE RESTRICTING MEMBER AND POWER SUPPLY DEVICE

(71) Applicant: Yazaki Corporation, Tokyo (JP)

(72) Inventors: Tsukasa Sekino, Makinohara (JP);
Mitsunobu Kato, Makinohara (JP);
Masaki Yokoyama, Makinohara (JP);
Tatsuya Otuka, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/483,141

(22) Filed: Apr. 10, 2017

(65) Prior Publication Data
US 2017/0297514 A1  Oct. 19, 2017

(30) Foreign Application Priority Data
Apr. 15, 2016 (JP) ................. 2016-082043

(51) Int. Cl.
*H02G 11/00* (2006.01)
*B60R 16/02* (2006.01)
(Continued)

(52) U.S. Cl.
CPC ........ *B60R 16/0215* (2013.01); *B60R 16/027* (2013.01); *F16G 13/16* (2013.01);
(Continued)

(58) Field of Classification Search
CPC ...... B60J 5/06; B60R 16/0215; B60R 16/027; E05F 11/00; E05F 15/646;
(Continued)

(56) References Cited

U.S. PATENT DOCUMENTS

| | | | |
|---|---|---|---|
| 4,367,967 A | * | 1/1983 | Albert, Jr. ............ G02B 6/4478 138/110 |
| 9,738,240 B2 | | 8/2017 | Kogure |

(Continued)

FOREIGN PATENT DOCUMENTS

| | | |
|---|---|---|
| EP | 1 375 259 A1 | 1/2004 |
| EP | 2 762 366 A1 | 8/2014 |

(Continued)

OTHER PUBLICATIONS

Communication dated Jan. 10, 2018, from French Patent Office in counterpart French application No. FR1753251.

(Continued)

*Primary Examiner* — Timothy Thompson
*Assistant Examiner* — Guillermo Egoavil
(74) *Attorney, Agent, or Firm* — Sughrue Mion, PLLC

(57) ABSTRACT

Provided is a curvature restricting member, allowing for a curvature of the wire harness in a predetermined allowable direction, and regulating the curvature of the wire harness in a regulating direction beyond a predetermined limit state or more, the curvature restricting member includes: a plurality of member pieces arranged along the wire harness; a flexible connecting portion connecting adjacent ones of the plurality of member pieces to each other, wherein the curvature is allowed in the allowable direction by adjacent ones among the plurality of member pieces at the curbed portions separating from each other on the side opposite to the connecting portion and the connection portion bending, and wherein the curvature is not allowed in the restricting direction beyond the limit state by adjacent ones among the plurality of member pieces at the curbed portion abutting against each other on the side opposite to the connecting portion.

6 Claims, 10 Drawing Sheets

(51) Int. Cl.
*F16G 13/16* (2006.01)
*B60R 16/027* (2006.01)
*H02G 3/04* (2006.01)
*B60J 5/06* (2006.01)

(52) U.S. Cl.
CPC ......... *H02G 3/0475* (2013.01); *H02G 11/006* (2013.01); *B60J 5/06* (2013.01)

(58) Field of Classification Search
CPC ......... E05Y 2400/654; E05Y 2800/344; E05Y 2900/531; F16G 13/16; H02G 3/04; H02G 3/38; H02G 3/0406; H02G 3/0475; H02G 11/00; H02G 11/006
USPC .......................................... 174/72 A; 49/360
See application file for complete search history.

(56) References Cited

U.S. PATENT DOCUMENTS

| | | | |
|---|---|---|---|
| 2004/0083655 A1 | 5/2004 | Suzuki et al. | |
| 2005/0029059 A1* | 2/2005 | Drew | B62M 25/02 188/65.1 |
| 2005/0252192 A1* | 11/2005 | Ikeda | F16G 13/16 59/78.1 |
| 2006/0254800 A1 | 11/2006 | Itou et al. | |
| 2007/0119610 A1 | 5/2007 | Kisu et al. | |
| 2007/0163795 A1* | 7/2007 | Utaki | F16G 13/16 174/19 |
| 2008/0066821 A1* | 3/2008 | Komiya | F16G 13/16 138/110 |
| 2014/0262421 A1* | 9/2014 | Kaihotsu | H02G 3/0487 174/68.3 |

FOREIGN PATENT DOCUMENTS

| | | | | |
|---|---|---|---|---|
| JP | 2004-136735 A | | 5/2004 | |
| JP | 2006-347525 A | | 12/2006 | |
| JP | 2006347270 A | * | 12/2006 | ......... B60R 16/0215 |
| JP | 2007-151257 A | | 6/2007 | |
| JP | 2008-067563 A | | 3/2008 | |
| JP | 2013013183 A | | 1/2013 | |
| JP | 2013-162716 A | | 8/2013 | |
| JP | 2015000619 A | | 1/2015 | |
| JP | 2015128366 A | | 7/2015 | |
| WO | WO 2014045630 A1 | * | 3/2014 | ............. B60R 16/02 |

OTHER PUBLICATIONS

Communication dated Aug. 7, 2018 from the Japanese Patent Office in counterpart application No. 2016-082043.

* cited by examiner

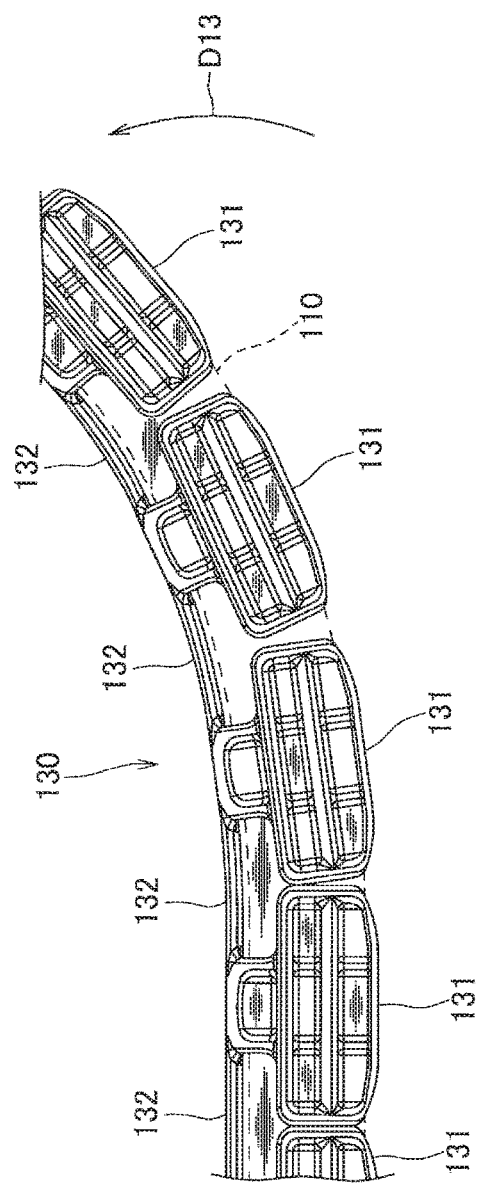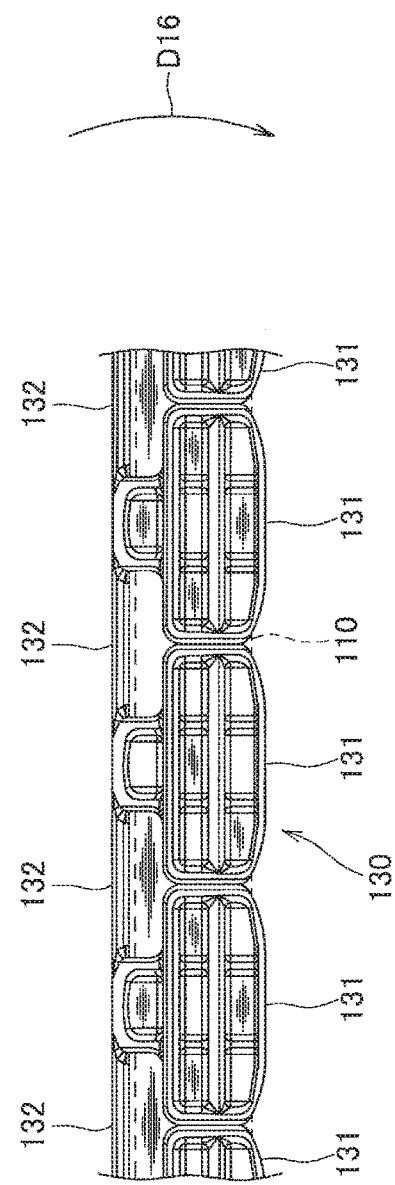

CURVATURE RESTRICTING MEMBER AND POWER SUPPLY DEVICE

BACKGROUND OF THE INVENTION

Field of the Invention

The present invention relates to a curvature restricting member for restricting the curvature of a wire harness in a predetermined regulating direction, and a power supply device to which the curvature restricting member is applied.

Description of the Related Art

Conventionally, a power supply device is well-known in a vehicle having a slide door connecting a vehicle body and a slide door with a wire harness (see, for example, Patent Documents 1 and 2). In such a power supply device, when the slide door opens and closes, the wire harness is held movably comfortably following the slide door.

Here, as a configuration for holding the wire harness as described above in the power supply device, for example, a structure which follows the slide door and holds swingably wire harness about the swing shaft intersecting with the opening and closing direction of the slide door has been proposed (for example, see Patent Documents 3 to 5). In this configuration, when opening and closing the slide door, the wire harness is configured to swing about the swing shaft described above following the slide door.

CITATION LIST

Patent Document

[Patent Document 1] Japanese Patent Application Publication No. 2004-136735
[Patent Document 2] Japanese Patent Application Publication No. 2006-347525
[Patent Document 3] Japanese Patent Application Publication No. 2007-151257
[Patent Document 4] Japanese Patent Application Publication No. 2008-067563
[Patent Document 5] Japanese Patent Application Publication No. 2013-162716

SUMMARY OF THE INVENTION

Technical Problem

Disadvantageously, in the power supply device having the swinging structure as described above, when the slide door opens and closes, wire harness may be deformed, and a part thereof may be curbed into a shape bulging toward the vehicle body side. On the other hand, there is a demand for suppressing the bulge toward the car body side when the wire harness bends. Therefore, in the field of the power supply device as described above, demanded is a curvature restricting member that can be applied to regulation of curvature in such a direction that the wire harness bulges toward the vehicle body side.

Accordingly, the present invention focuses on the above-mentioned requirement, and aims to provide a curvature restricting member in a wire harness capable of restricting the curvature in a desired regulation, and a power supply device to which such curvature restricting member is applied.

Solution to Problem

In order to solve the above-mentioned problems, the curvature restricting member of the present invention, arranged along a wire harness so as to guide a curvature thereof, regulating the curvature on a predetermined plane, allowing such curvature that bends the wire harness in a predetermined allowable direction on the plane, regulating such curvature that bends the wire harness in a regulating direction opposite to the allowable direction so as not to bend in a predetermined limit state or more, includes: a plurality of member pieces arranged along the wire harness; a flexible connecting portion, located inside a curbed shape when the plurality of member pieces is curbed in the allowable direction, and connecting adjacent ones of the plurality of member pieces to each other, wherein the curvature is allowed in the allowable direction by adjacent ones among the plurality of member pieces at the curbed portions separating from each other on the side opposite to the connecting portion and the connection portion bending, and wherein the curvature is not allowed in the restricting direction beyond the limit state by adjacent ones among the plurality of member pieces at the curbed portion abutting against each other on the side opposite to the connecting portion.

Although while bendable in the allowable direction as described above, the curvature restricting member of the present invention is unbendable in the regulation direction that is opposite thereto by those adjacent to each other among the plurality of member pieces at the curbed portion abutting against each other on the opposite side. Then, the curvature restricting member of the wire harness is arranged along the wire harness such that the curvature restricting member of the present invention becomes unbendable in the regulation direction desired to regulate the curvature of the wire harness, thereby making it possible to regulate the curvature in the desired regulation direction in the wire harness.

Further, it is preferable that while the curvature restricting member of the present invention is not curbed in both the allowable direction and the restricting direction, the interval between the plurality of member pieces may be different in the arrangement direction.

In such a curvature restricting member, a shape when the curvature restricting member is bent to the limit state in the regulation direction as described above is not a simple linear shape or circular arc shape but an arbitrary shape according to the mutual interval between the different member pieces as described above. As an example of such curvature restricting member, it is taken that when the force to bend to the wire harness in the regulating direction is applied to the wire harness, the mutual interval between the member pieces is set to the desired interval, at the designing stage, depending on the shape into which the wire harness is desired to be formed. Such design makes the shape when the curvature restricting member is bent to the limitation state in the aforementioned regulating direction a desired shape.

Further, it is also preferable that in the curvature restricting member of the present invention, the plurality of member pieces and the connecting portion may be mutually integrally molded.

According to this preferable curvature restricting member, since it is integrally molded as described above, assembly work and the like are unnecessary, and the manufacturing cost can be reduced.

Further, it is also preferable that in the curvature restricting member of the present invention, each of the plurality of member pieces may include a pair of opposed walls opposed to each other so as to sandwich the wire harness between the pair of opposed walls, and connecting wall coupling the pair of opposed walls to each other, a cross section of which intersects with the longitudinal direction of the wire harness has a substantially C-shaped.

According to this preferable curvature restricting member, for example, each member piece having a substantially C-shaped cross section can be easily laid along the wire harness in such a fashion to cover the wire harness.

Further, in the preferable curvature restricting member, the plurality of member pieces is arranged such that each of the coupling walls is located on the inner side of the curbed shape at the time of curvature in the allowable direction, and the coupling walls may couple the coupling walls of the adjacent member pieces to each other.

Further, in the curvature restricting member, the pair of opposed walls may be a substantially T-shaped in which the respective roots are connected to the coupling walls.

Alternatively, in the above-described preferable curvature restricting member in which the cross-sectional shape of each member piece is substantially C-shaped, the plurality of member pieces is arranged such that one of the opposed walls of each pair of opposed walls is located inside the curbed shape at the time of curvature in the allowable direction, and the coupling wall may couple to each other the one pair of opposed walls of the member piece adjacent to each other.

Further, in order to solve the above problem, a power supply device of the present invention electrically connecting a vehicle body and a slide door in a vehicle having the vehicle body and the slide door, includes: a wire harness arranged between the vehicle body and the slide door; and a curvature restricting member, disposed so as to guide a curvature along the wire harness, limiting the curvature on a plane intersecting the slide door and along an opening and closing direction of the slide door, allowing such curvature as to bend the wire harness in an allowable direction toward an outside of the vehicle body on the plane, and regulating such curvature beyond a predetermined limit state as to bend the wire harness in a restricting direction toward the inside of the vehicle body on the side opposite to the allowable direction, wherein the curvature restricting member includes: a plurality of member pieces arranged along the wire harness, and a flexible connecting portion arranged inside a curbed shape of the plurality of member pieces when curbed in the allowable direction and connecting adjacent ones of the number of member pieces to each other, wherein in the allowable direction, adjacent ones of the curbed portions among the plurality of member pieces are separated from each other on a side opposite to the connecting portion and the connecting portion bends, and thereby the curvature restricting member is bendable, and wherein in the restricting direction, ones adjacent to each other among the plurality of member pieces at the curbed portion abutting against each other on the opposite side to the connecting portion, and thereby the bending restricting member is unbendable beyond the predetermined limit state.

According to the power supply device of the present invention, while curvature is allowed in such an allowable direction as to bend the wire harness outside the vehicle body, curvature is unbendable more than the limit state in such a direction as to bend the wire harness inside the vehicle body on the opposite side thereof, regulating the curvature of the wire harness. This regulates the curvature in the direction in which the wire harness bulges toward the car body side.

Further, in the power supply device of the present invention, it is preferable that the power supply device further includes: a door side holding part fixed to the slide door, holding swingably a part of the wire harness on the slide door side about a door side swing shaft crossing the plane; a vehicle body side holding part fixed to the vehicle body, holding swingably a part of the wire harness on the vehicle body side about a vehicle body side swing shaft crossing the plane; and a restricting portion regulating position of the wire harness on a front side in an opening direction of the slide door around the door side swing shaft such that the wire harness and the slide door form an acute angle equal to or more than a predetermined angle around the door side swing shaft when the slide door fully closes.

In this preferable power supply device, when the slide door fully closes, the wire harness and the slide door form an acute angle of a predetermined angle or more on the front side in the opening direction of the slide door about the door side swing shaft, and the wire harness is inclined to some extent with respect to the slide door. As a result, the wire harness swings swiftly in the direction in which the inclination angle with respect to the slide door becomes large when the slide door opens and becomes a substantially U shape from the vehicle body side to the slide door side. In the wire harness having such a shape, while the slide door moves, combined with the regulation by the above-mentioned curvature restricting member, the linear shape is kept satisfactory in the part of the body side corresponding to the one arm of the U shape. As a result, while the slide door moves, the bulge of the wire harness toward the car body side can be further regulated. Also, with this preferred power supply device, rapid swing of the wire harness when the slide door opens as aforementioned is prompted by the regulation in the regulation section above. For this reason, it is unnecessary to provide an urging spring or the like for swinging the wire harness as such, simplifying the structure thereof.

It is to be noted that while described here is only the mode specific to the power supply device of the power supply device of the present invention, various preferred forms of the above-described curvature restricting member of the present invention are applicable to the power supply device of the present invention.

Advantages of the Invention

According to the present invention, a curvature restricting member can be obtained that allows for restricting the curvature of the wire harness in a desired regulating direction and a power supply device to which such a curvature restricting member is applied.

BRIEF DESCRIPTION OF THE DRAWINGS

FIGS. 5A and 5B are views showing a state where the curvature restricting member is bendable in the allowable direction shown in FIG. 1, and unbendable beyond the limit state in the restricted direction on the side opposite to the allowable direction;

DESCRIPTION OF EMBODIMENTS

Hereinafter, a curvature restricting member and a power supply device according to a first embodiment of the present invention will be described.

Figure 1:
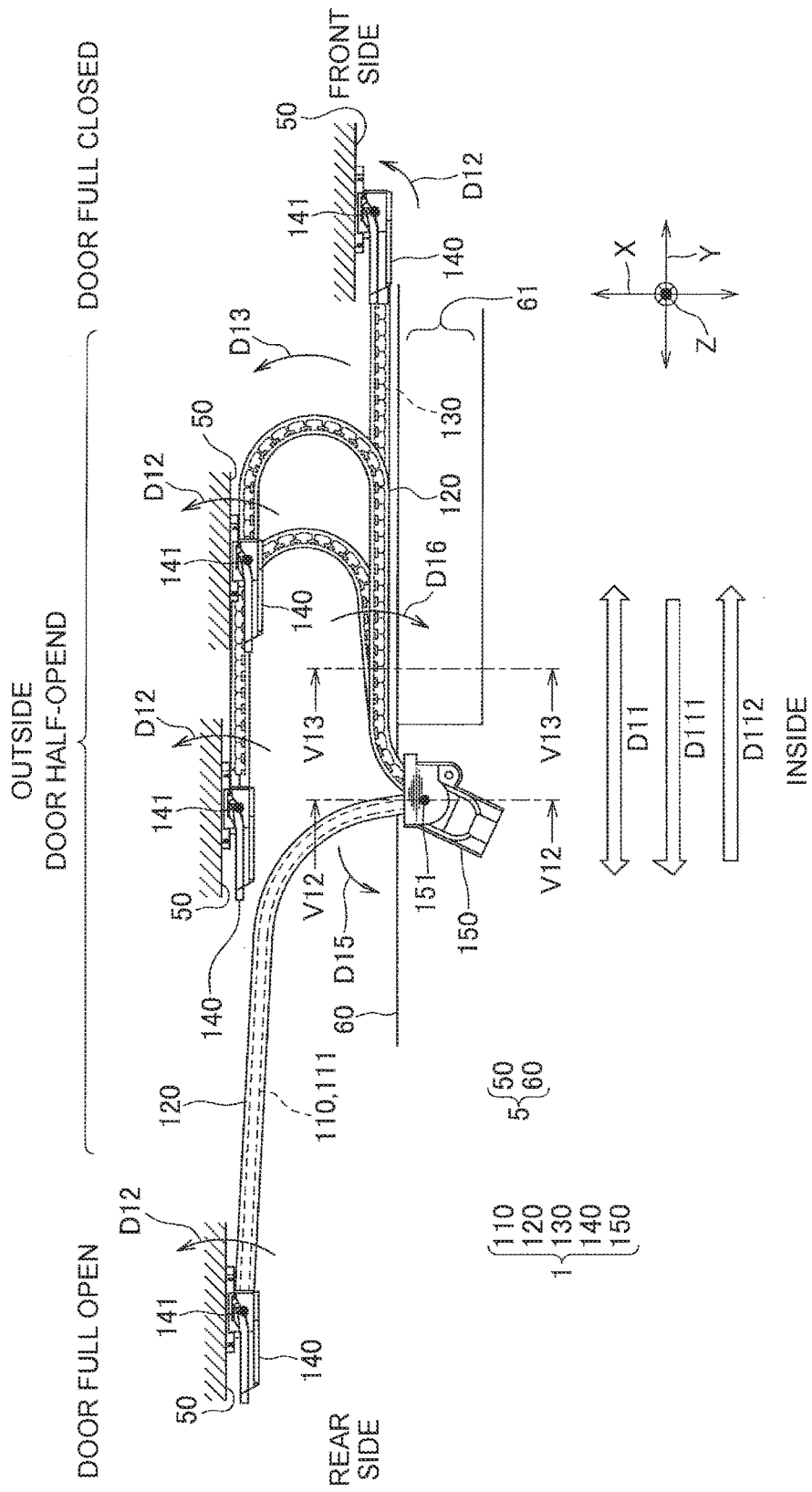
FIG. 1 is a view showing a power supply device to which a curvature restricting member according to a first embodiment of the present invention is applied.

FIG. 1 is a view showing a power supply device to which a curvature restricting member according to a first embodiment of the present invention is applied. The power supply device 1 of the present embodiment is one electrically connecting via the wire harness 110 arranged between the vehicle body 60 and the slide door 50 in the vehicle 5 having the vehicle body 60 and the slide door 50. In FIG. 1, the right side in the figure corresponds to the front side of the vehicle 5, the left side in the figure the rear side of the vehicle 5, the upper side in the figure the outside of the vehicle 5, and the lower side in the figure the inside of the vehicle 5. In addition, the vertical direction in the figure is the X direction in the present embodiment, and the horizontal direction in the figure the Y direction in the embodiment, and the direction perpendicular to the paper surface the Z direction.

In the power supply device 1, electric power is supplied from a not shown power source provided in the vehicle body 60 via the wire harness 110 to the not-shown electric device provided in the slide door 50. Also, in this the electric device 1, electric signals are also exchanged between not shown control means provided in the vehicle body 60 and the not shown electric device provided in the slide door 50 via the wire harness 110. The electric device 1 includes the wire harness 110, a corrugated tube 120, a curvature restricting member 130, a door side holding part 140, and a vehicle body side holding part 150.

The wire harness 110 is formed by bundling a plurality of electric wires 111, and the resin made flexible corrugated tube 120 passes therethrough a part of the wire harness 110 between the vehicle body 60 and the slide door 60. The curvature restricting member 130 is arranged between an inner surface of the corrugated tube 120 and the wire harness 110, surrounding the wire harness 110 in the circumferential direction, such as to follow the wire harness 110. The curvature restricting member 130 will be explained in detail later.

One end of the corrugated tube 120 on the slide door 50 side is held on the door side holding part 140 swingably on the XY plane with the Z direction being the vertical direction of the vehicle 5 as the swing shaft direction. The door side holding part 140 is fixed to the slide door 50. The door side swing shaft 141 provided in the door side holding part 140 along the Z direction is a shaft parallel to the slide door 50 and orthogonal to the opening/closing direction D11 of the slide door 50 (the Y direction which is the longitudinal direction of the vehicle 5). One end of the corrugated tube 120 on the slide door 50 side is held swingably about the door side swing shaft 141 by the door side holding part 140. Holding of the corrugated tube 120 by the door side holding part 140 makes the wire harness 110 held swingably around the door side swing shaft 141 on the XY plane. The wire harness 110 on the slide door 50 side comes out from one end of the corrugated tube 120 on slide door 50 side. Further, the wire harness 110, after exiting from the door side holding part 140 through a not shown passage inside the door side holding part 140, extends to an electrical equipment of the slide door 50.

On the other hand, one end of the corrugated tube 120 on the vehicle body 60 side is held swingably on the vehicle body side holding part 150 on the XY plane with the Z direction being the vertical direction of the vehicle 5 as the swing shaft direction. The vehicle body side holding part 150 is fixed to the vehicle body 60. The vehicle body side swing shaft 151 provided in the vehicle body side holding part 150 along the Z direction is a shaft parallel to the slide door 50 and orthogonal to the opening/closing direction D11 of the slide door 50. One end of the corrugated tube 120 on the vehicle body 60 side is held swingably around the vehicle body side swing shaft 151 by the vehicle body side holding part 150. Holding the corrugated tube 120 by the vehicle body side holding part 150 makes the wire harness 110 held swingable on the XY plane around the vehicle body side swing shaft 151. A side of the wire harness on the vehicle body 60 side exits from one end of the corrugated tube 120 on the vehicle body 60 side and further passes through an not shown passage inside the vehicle body side holding part 150 before extends to not shown power source and control means in the vehicle body 60.

As shown in FIG. 1, when the slide door 50 is fully closed the door side holding part 140 is positioned on the front side of the vehicle 5 with respect to the vehicle body side holding part 150. Then, the corrugated tube 120, that is, the wire harness 110 thereinside extends in a substantially linear state between the car body side holding part 150 and the door side holding part 140.

At the initial stage when the slide door 50 opens in the opening direction D 111 toward the rear of the vehicle 5, one end of the corrugated tube 120 on the slide door 50 side swings as follows. That is, this one end swings on the XY plane such as to be separated from the slide door 50 and heads toward the front side of the vehicle 5 in an opposite direction to the opening direction D 111. The door side holding part 140 is provided with a coil spring to encourage such swing. This coil spring makes the one end of the corrugated tube 120 on the slide door 50 side separated from the slide door 50, urged in the urging direction D12, and head in the direction opposite to the opening direction D111 of the slide door 50.

Due to the above-described swinging at the initial stage of opening of the slide door 50, the wire harness 110 inside the tube 120 bends as follows during the movement of the door 50 in the opening direction D 111, that is, when the slide door 50 is half-opened. That is, the wire harness 110, as shown in FIG. 1, is bent in the allowable direction D13 and curved from the vehicle body side holding part 150 to the door side holding part 140 such as to draw a U shape on the XY plane convexly to the front side of the vehicle 5 toward the outside of the vehicle body 60.

In the following description, the wire harness 110 inside the corrugated tube 120 may be simply referred to as a wire harness 110.

Compared with the case of curvature the corrugated tube 120 by forming the wire harness 110 in an S shape for example, the curvature of the U shape as described above reduces the burden given to the corrugated tube 120 or the wire harness 110.

While the slide door 50 moves in the opening direction D111, the arm in the U shaped of the wire harness 110 on the slide door 50 side is urged by the urging direction D12 in the door side holding part 140 to extend linearly to the front side of the vehicle 5. At this time, the arm on the vehicle body 60 side is urged to extend linearly in front of the vehicle 5. The behavior of these parts and the operation of the curvature restricting member 130 to be described later make the U shape trimmed on the XY plane of the wire harness 110 during the movement of the slide door 50.

As the slide door 50 moves in the opening direction D111, the arm in the U shaped of the wire harness 110 on the slide door 50 side extends and the arm on the vehicle body 60 side shortens. And, when the arm on the body 60 side becomes shorter to some extent, one end of the wire harness 110 on the vehicle body 60 side swings in the swinging direction D15 to the rear side of the vehicle 5. After that, in this state, the slide door 50 moves in the opening direction D111 and reaches the fully opened state.

When the slide door 50 is closed from the fully open state in the closing direction D112, the wire harness 110 is reversed in the operation from that when the slide door 50 is opened. First, at its initial stage, one end of the wire harness 110 on the vehicle body 60 side swings oppositely to the swinging direction D15, the wire harness 110 thereby becomes U shape on the XY plane. After that, at the stage where the slide door 50 continues to move in the closing direction D112 and the arm in the U shape on the slide door 50 side is shortened to some extent, one end of the wire harness 110 on the slide door 50 side swings as follows. That is, at this stage, one end of the wire harness 110 on the slide door 50 side swings against the urging force of the door side holding part 140 on the side opposite to the urging direction D12 to the rear side of the vehicle 5. Thereafter, keeping in this state, the slide door 50 moves in the closing direction D 112, and the wire harness 110 reaches the fully closed state while being extended to the linear state.

Here, the end portion of the floor of the vehicle body 60 on the slide door 50 side becomes lowered by one level to be the step 61 for the passenger to put his or her feet on boarding. When opening and closing the slide door 50, as described above, the U-shaped arm of the wire harness 110 on the vehicle body 60 side passes near the step 61 on the XY plane.

In this case, generally, in the field of the power supply device attached to the slide door of the vehicle, there is a demand to suppress the bulge toward the car body side when the wire harness bends at opening and closing of door. Therefore, in the present embodiment, in order to regulate the curvature which bulges the wire harness 110 to the vehicle body 60 side, the curvature restricting member 130 is provided arranged along the wire harness 110. The curvature restricting member 130 limits the curvature on the XY plane with respect to the wire harness 110. Then, the curvature restricting member 130 allows the curvature in the allowable direction D13 to bend the wire harness 110 to the outside of the vehicle body 60 on the XY plane. On the other hand, the curvature of a predetermined limit state or more in the regulation direction D 16 bending the wire harness 110 inside the vehicle body 60 on the side opposite to the allowable direction D13 is regulated.

Figure 2:
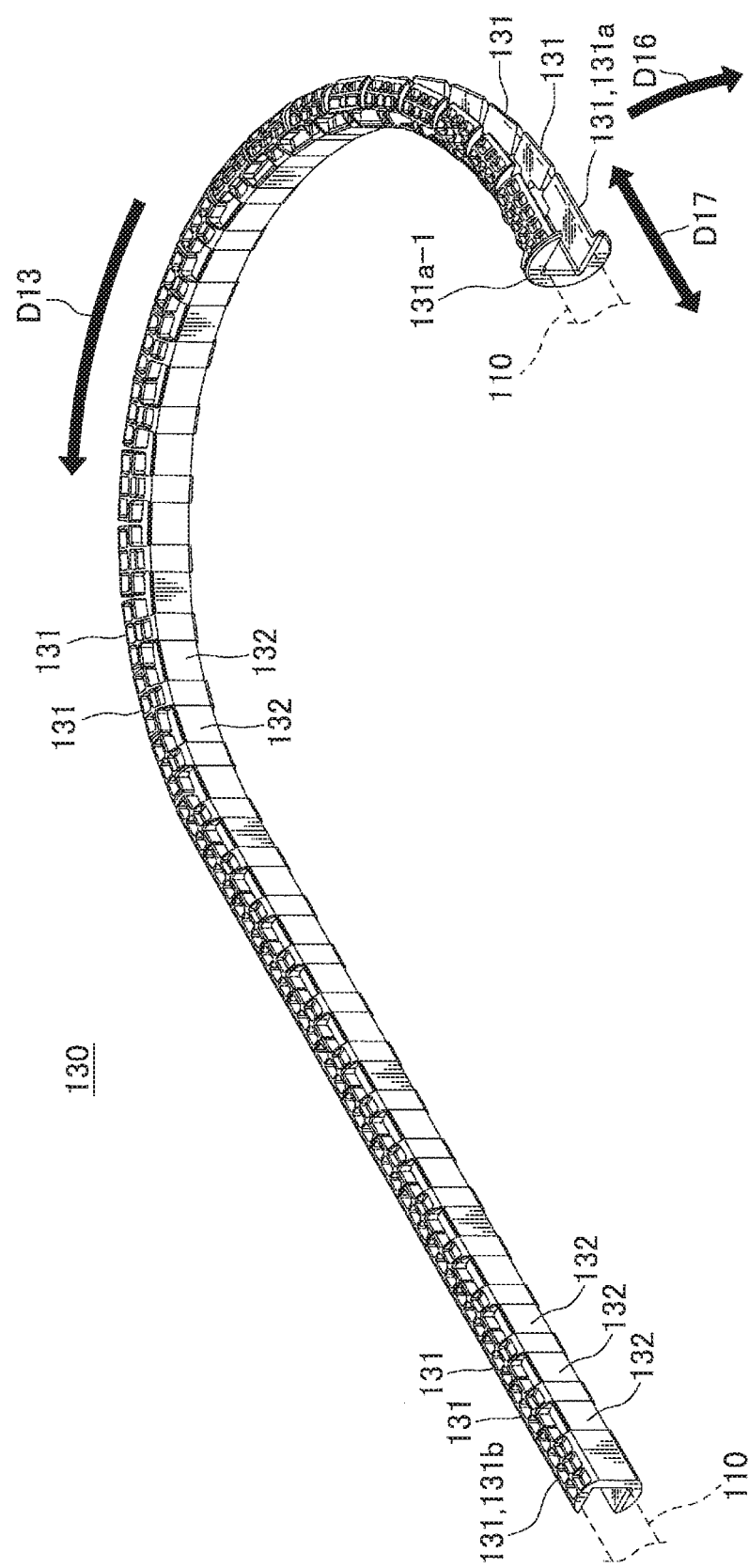
FIG. 2 is a perspective view showing the curvature restricting member shown in FIG. 1.

FIG. 2 is a perspective view showing the curvature restricting member shown in FIG. 1.

As shown in FIG. 1, the curvature restricting member 130 is provided between the inner surface of the corrugated tube 120 and the wire harness 110, surrounding the wire harness 110 in the circumferential direction and along the harness 110 so as to guide the curvature thereof. The curvature restricting member 130 has substantially the same length as the corrugated tube 120. In FIG. 2, the curvature restricting member 130 on the right side is on the vehicle body 60 side, and end portion of the left side the slide door 50 side.

The curvature restricting member 130 includes a plurality of member pieces 131 arranged along the wire harness 110, and a connecting portion 132 that connects adjacent ones of the plurality of member pieces 131 to each other. In the present embodiment, the plurality of member pieces 131 and the connecting portions 132 are mutually integrally molded. In FIG. 2, there are shown the curvature restricting member 130 that follows the wire harness 110 bent in the allowable direction D 13 on the XY plane shown in FIG. 1 and bent into a U shape, and that is bent in the similar U shape. The connecting portion 132 is a flexible member arranged along the wire harness 110 so as to be located inside the curbed shape when the wire harness is bent as such.

Figure 3A:
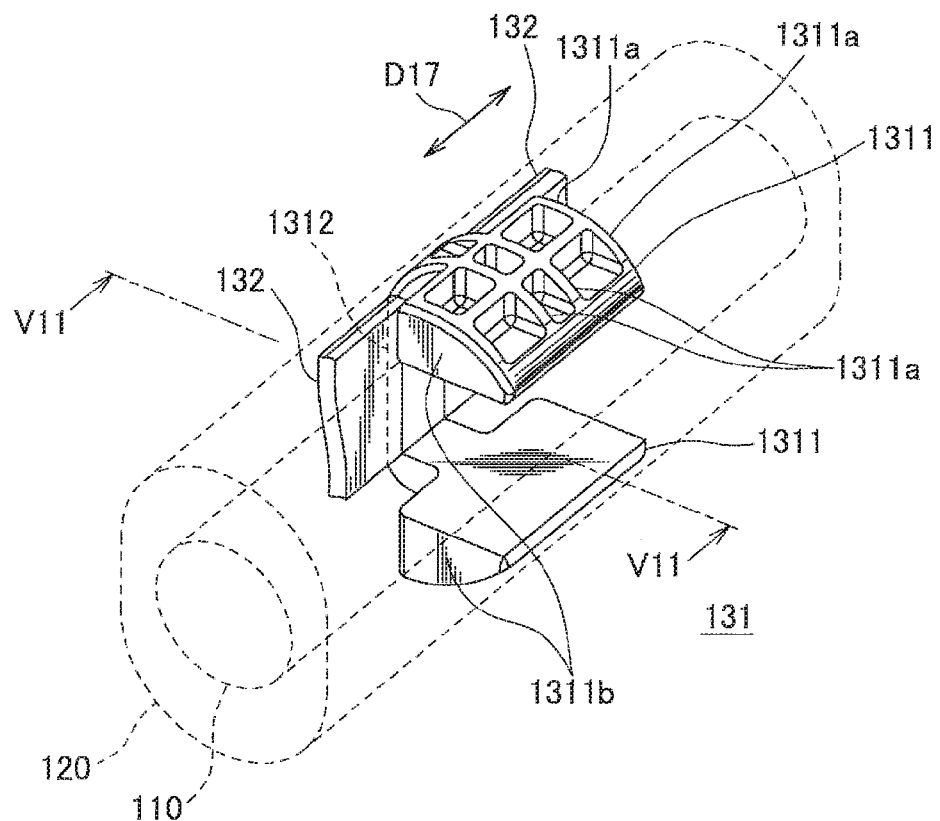
FIGS. 3A and 3B are views showing one of a plurality of member pieces constituting the curvature restricting member shown in FIG. 2.
Figure 3B:
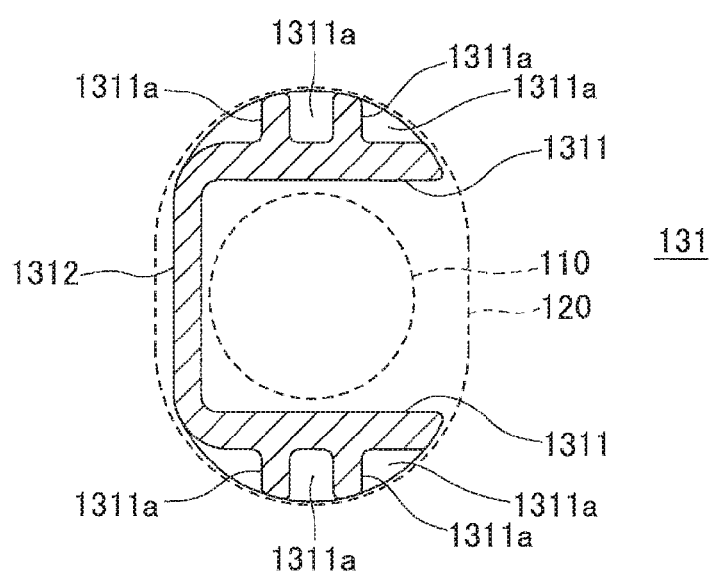

FIGS. 3A and 3B show one of the plurality of member pieces constituting the curvature restricting member shown in FIG. 2 as a typical example. FIG. 3A is a perspective view of the member 131, FIG. 3B a cross-sectional view showing a cross section taken along line V11-V11 in FIG. 3 (A).

As shown in the representative example in FIGS. 3A and 3B, each of the plurality of member pieces 131 includes a pair of opposed walls 1311 opposed to each other so as to mutually sandwich the wire harness 110, and a connecting wall 1312 connecting the opposed walls 1311 to each other. Each of the member pieces 131 is formed in a substantially C shape as shown in FIGS. 3A and 3B by the three walls as shown in FIGS. 3A and 3B in the shape of the cross section that intersects with the longitudinal direction D17 of the wire harness 110.

As shown in FIG. 3A, each of the pair of opposed walls 1311 has a substantially T shape in the planer view. A portion corresponding to the T-shaped cross bar extending in the length direction D17 of the wire harness 110 is made narrow, and the portion corresponding to the T-shaped vertical bar intersecting with the lengthwise direction D17 is formed narrow and short. The root of the narrow portion of each of the T-shaped opposed walls 1311 is joined to the connecting wall 1312. The connecting wall 1312 connects these narrow portions.

Further, the surface opposite to the wire harness 110 in each of the pair of opposed walls 1311 has an uneven shape in which reinforcing ribs 1311a are assembled in a lattice shape. In addition, the envelope shape of the outer surface provided with the reinforcing ribs 1311a is a convex curved surface along the inner surface of the corrugated tube 120. Both end surfaces 1311b of wide width portion in each opposed wall 1311 in the length direction D 17 forms a substantially wedge-shaped surface as it is as the side surface shape of the reinforcing rib 1311a.

The plurality of member pieces 131 are arranged along the wire harness 110 so that wedge-shaped end faces 1311b of the opposed wall 1311 of each member piece 131 faces each other.

In the present embodiment, the plurality of member pieces 131 is arranged so that the connecting wall 1312 connecting the pair of opposed walls 1311 is positioned inside the curbed shape of the wire harness 110, that is, inside the curved shape when curbed in the allowable direction D 13 as shown in FIG. 2. And the connecting portion 132 connects the coupling walls 1312 of the mutually adjacent member pieces 131 to each other. Further, the connecting portion 132 is a plate-shaped member as shown in FIG. 3A, and is formed to be thin to such a thickness that it can bend both in the allowable direction D 13 and in the opposite direction. Furthermore, the curvature restricting member 130 is formed such that the plate-like connecting portion 132 is formed as shown in FIG. 1 so as to be perpendicular to the XY plane. As a result, the curvature restricting member 130 is restricted on the XY plane, so that the curvature of the wire harness 110 is also restricted on the XY plane.

Further, in the present embodiment, the end of the curvature restricting member 130 on the right side in FIG. 2, that is, the member piece 131a positioned at the end portion of the vehicle body 60 side is held on the vehicle body side holding part 150 shown in FIG. 1 together with the end portion of the corrugated tube 120. On the other hand, in the curvature restricting member 130, the left end portion in FIG. 2, that is, the member piece 131b located at the end portion on the slide door 50 side are not held by the door side holding part 140 shown in FIG. 1. As a result, the member piece 131b is made separable from the door side holding part 140 according to the curvature of the curvature restricting member 130. As shown in FIG. 2, the member piece 131a on the vehicle body 60 side is provided with a flange 131a-1 for holding this member piece 131a in the vehicle body side holding part 150.

Figure 4:
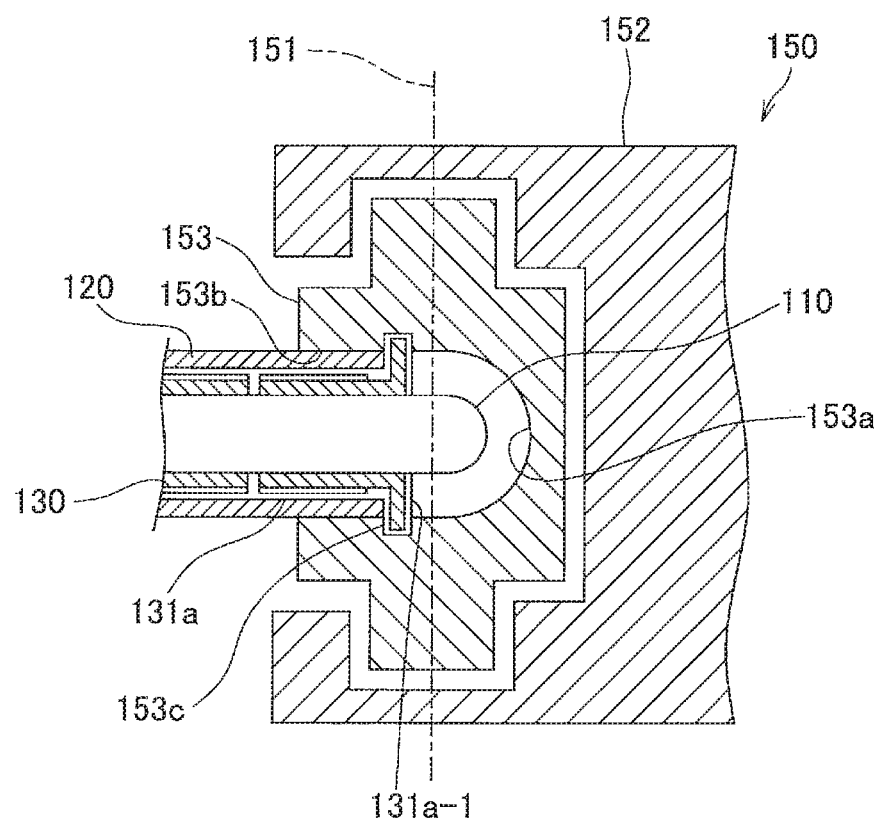
FIG. 4 is a view showing a state in which member pieces of a curvature restricting member on the vehicle body side is held by a vehicle body side holding part with a sectional view of a cross section taken along the line V12-V12 in FIG. 1.

FIG. 4 is a view showing a state where the member piece of the curvature restricting member on the vehicle body side is held by the vehicle body side holding part, and is a schematic cross-sectional view taken along the line V12-V12 in FIG. 1.

The vehicle body side holding part 150 includes a fixing portion 152 fixed to the vehicle body 60, a swing portion 153 supported swingably around the vehicle body side swing shaft 151 also shown in FIG. 1. Inside the swing portion 153, an insertion hole 153a through which the wire harness 110 is passed is provided, and the insertion hole 153a opens to the slide door 50 side. Then, at the opening 153b of the swing portion 153, the end of the corrugated tube 120 on the vehicle body 60 side is fixed. Further, on the back side of the opening 153b, a fitting groove 153c is formed into which the flange 131a-1 of the member piece 131a of the curvature restricting member 130 on the vehicle body 60 side exposed from the end portion on the vehicle body side 60 of the corrugated tube 120 is fitted. Fitting the flange 131a-1 into this fitting groove 153c makes the member on the vehicle body 60 side of the curvature restricting member 130 held on the vehicle body side holding part 150 together with the end portion of the corrugated tube 120. It is to be noted that the vehicle body side holding part 150 may be provide with an urging member such as a coil spring that urges the swing portion 153 in the direction opposite to the swinging direction D 15 shown in FIG. 1. Urging by this urging member plays an auxiliary role of extending linearly the wire harness 110 on the vehicle body 60 side to the front side of the vehicle 5.

As described above, the curvature restricting member 130 on which the end piece member 131a is held is restricted to the curvature on the XY plane shown in FIG. 1, and is bendable in the allowable direction D13 as well. Then, the curvature restricting member 130 is unbendable beyond the limit state to be described later in the regulation direction D16 toward the inside of the vehicle body 60 on the side opposite to the allowable direction D13.

FIGS. 5A and 5B show a state in which the curvature restricting member can be bent in the allowable direction shown in FIG. 1 and cannot be bent more than the limit state in the restricted direction opposite to the limit state. FIG. 5A shows that the curvature restricting member 130 can be bent in the allowable direction D13. FIG. 5B shows that the curvature restricting member 130 cannot be bent beyond the limit state in the regulating direction D16.

In the allowable direction D13, as shown in FIG. 5A, adjacent ones to each other among the plurality of member pieces 131 at a curbed portion are spaced apart from each other on the opposite side to the connecting portion 132 while the connecting portions 132 is bent, and therefore the curvature restricting member 130 can be bent. As a result, the harness 110 is allowed to bend in the allowable direction D13.

On the other hand, as to the regulation direction D16, as shown in FIG. 5B, adjacent ones to each other among the plurality of member pieces 131 at the curbed portion abut onto each other on the side opposite to the connecting portion 132, the curvature restricting member 130 cannot be therefore bent beyond the limit state. At this curbed portion, the curvature restricting member 130 cannot bend in the restricting direction D 16 beyond this limit state where the state in which the adjacent ones are in contact with each other is limited in the curvature in the regulation direction D16. As a result, the wire harness 110 is restricted in the curvature that bends more than the limit state of the member 130 in the regulation direction D16.

In this embodiment, except for a part of the vicinity of the vehicle body side holding part 150 which will be described later, concerning the arrangement direction (that is, the length direction D 17 of the wire harness 110) of the plurality of member pieces 131 the curvature restricting member 130 is configured across the whole length including its middle portion as follows. That is, across generally the whole length of the above described portion, the curvature restricting member 130, as shown in FIG. 5B, is configured such that the adjacent member pieces 131 abut to each other on the side opposite to the connecting portion 132 when it is in a substantially linear state. That is, in the present embodiment, the limit state of the regulation direction D 16 is set to a substantially linear state in a portion except the portion in the vicinity of the vehicle body side holding part 150. This allows a portion other than a portion curbed in the allowable direction D13 in the wire harness 110 kept in a substantially linear shape.

Here, as shown in FIG. 1, with respect to the regulation direction D16 in the present embodiment, the swing range on the XY plane of the end portion of the wire harness 110 in the side holding part 150 is the one as follows. That is, this swing range is one in which the end portion of the wire harness 110 stops one step before the wire harness 110 heads in parallel to the opening and closing direction D11 of the slide door 50. Therefore, in the present embodiment, with respect to a proton in the vicinity of the vehicle body side holding part 150, the curvature restricting member 130 is configured to be able to bend, slightly relaxing the regulation against the curvature in the regulation direction D16 and until a certain extent in the regulation direction D16. As a result, the portion of the wire harness 110 in the vicinity of the vehicle body side holding part 150 is slightly bent in the regulation direction DK and the portion kept in the substantially liner shape as described above is made to head in the direction parallel to the opening and closing direction D11 of the slide door 50.

Figure 6A:
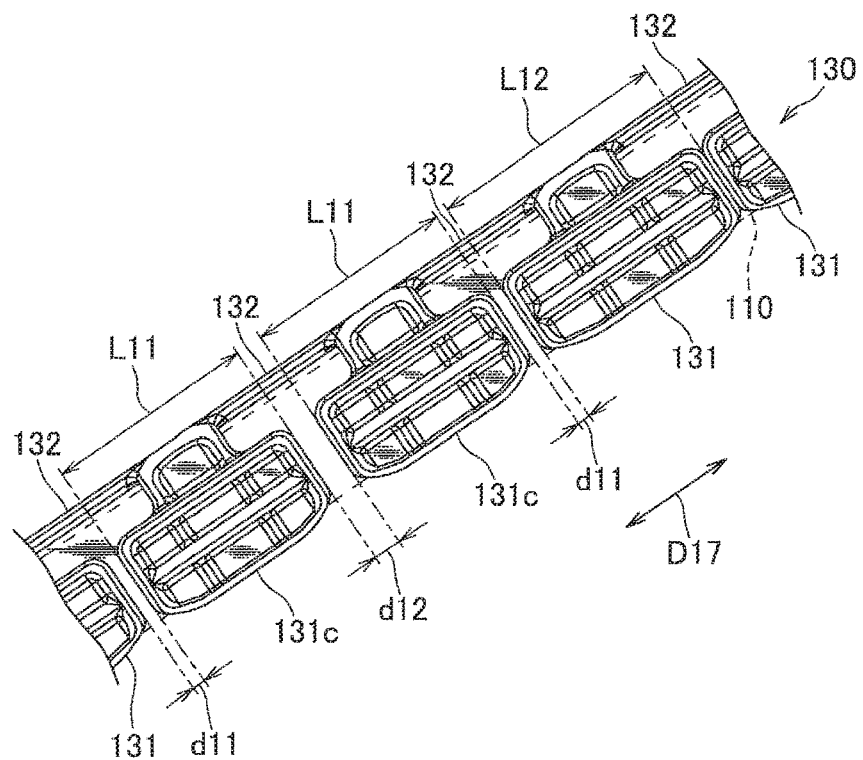
FIGS. 6A and 6B are diagrams showing a state where the restriction is slightly relaxed on the curvature of the regulating direction of the wire harness in a part in the vicinity of the vehicle body side holding part in the curvature restricting member.
Figure 6B:
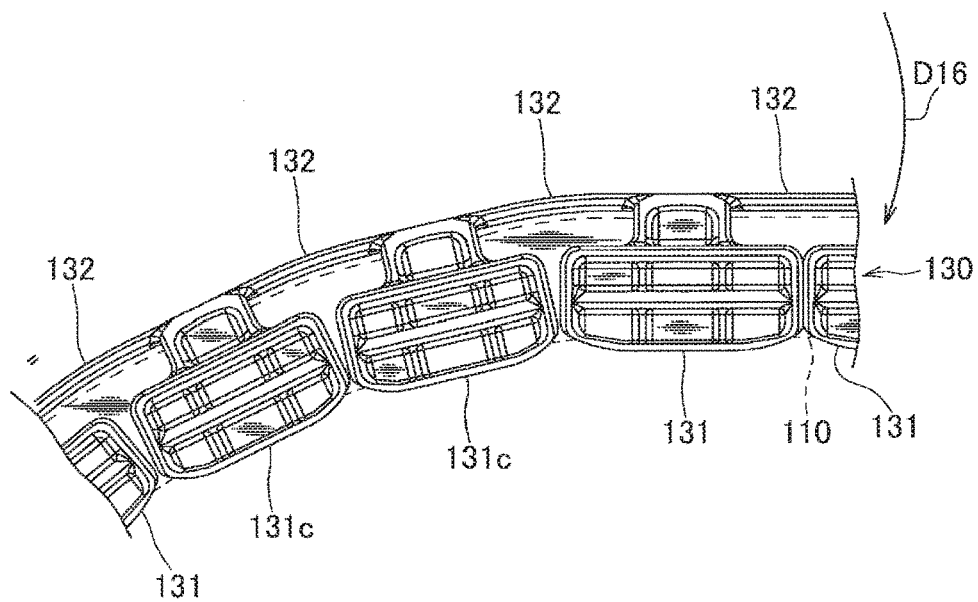

FIGS. 6A and 6B are perspective views showing a curbed restricting member of the wire harness how the restriction on the curvature in the regulation direction of the wire harness 110 is slightly relaxed in the portion in the vicinity of the vehicle body side holding part. FIG. 6A is a view showing the curvature restricting member 130 where the portion of the wire harness 110 in the vicinity of the vehicle body side holding part 150 lies in a substantially linear state. FIG. 6B shows how further curvature is regulated by the curvature restricting member 130 where the aforementioned portion of the wire harness 110 is bent to some extent in the regulation direction D16.

As shown in FIG. 6A, in the curvature restricting member 130, the length L11 of the member piece 131c in the direction D17 of the wire harness 110 in the vicinity of the vehicle body side holding part 150 is somewhat shorter than the length L 12 of the other member piece 131. As a result, with respect to the portion in the vicinity of the vehicle body side holding part 150, even when the curvature restricting member 130 is in a substantially linear state, spaces d11 and d12 open between the member pieces 131c and 131. For this reason, as for this portion as shown in FIG. 6B, until adjacent member pieces 131c, 131 come in contact with each other on the opposite side of the connecting portion 132 to close the spaces d11, d12, the connecting portion 132 bends in the regulation direction D16. Curvature of the connecting portion 132 in this manner allows the regulating member 130 to be bent to some extent in the regulation direction D16. This allows the regulation on the curvature of the wire harness 110 in the regulation direction D16 at the portion in the vicinity of the vehicle body side holding part 150 to be slightly relaxed. State as shown in FIG. 6B becomes a limit state of the portion of the curvature restricting member 130 in the vicinity of the vehicle body side holding part 150.

As described above, in the present embodiment, a space between the plurality of member pieces 131, with a state of substantially straight line not curbed in any of the allowable direction D13 and the regulation direction D16 in the curvature restricting member 130, is different in the arrangement direction (length direction D 17). That is, as shown in FIG. 5B, in a portion extending substantially over the entire length excluding the portion in the vicinity of the vehicle body side holding part 150, the space between the member pieces 131 is substantially zero, and in the vicinity of the vehicle body side holding part 150, as shown in FIG. 6A the spaces d11 and d12 still open. As a result, at two points of the portion and the other portion in the vicinity of the vehicle body side holding part 150 in the curvature restricting member 130, the limit state with respect to the curvature in the regulation direction D16 differs as described above.

The curvature restricting member 130 of the first embodiment described above is bendable in the allowable direction D13 described above. On the other hand, in the restricting direction D16 on the opposite side, adjacent ones to each other among the plurality of member pieces 131 at a curbed portion are brought into contact with each other on the side opposite to the connecting portion 132, which disables the curvature. Then, in the power supply device 1, the curvature restricting member 130 is arranged along the wire harness 110 so that the curvature restricting member 130 becomes unbendable in a desired direction desired to regulate the curvature of the wire harness 110. As a result, the curvature in the wire harness 110 can be regulated in the desired direction as the regulation direction D16. As a result, at the time of opening and closing the slide door 50, the wire harness 110 is preferably positioned as follows in the vicinity of the vehicle body 60.

Figure 7:
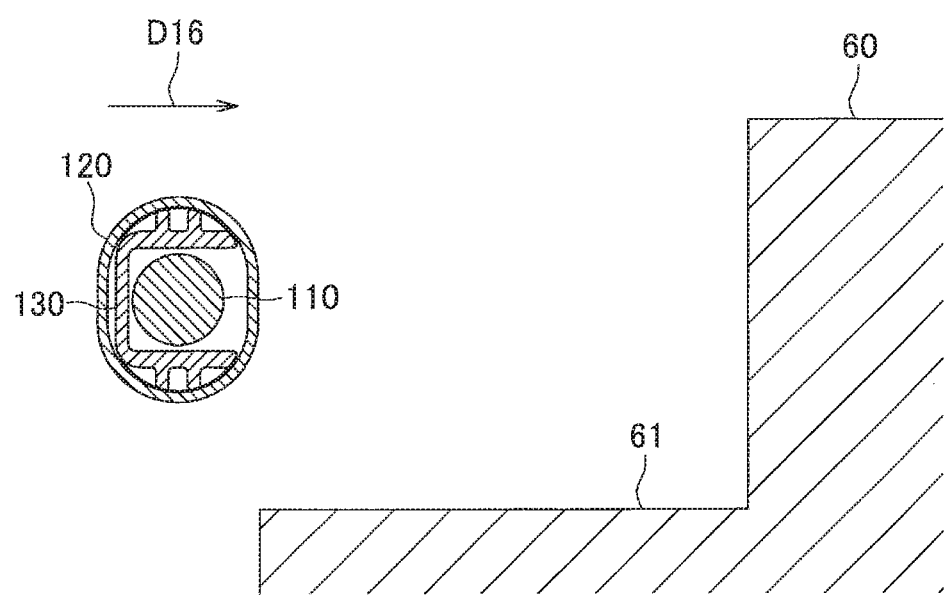
FIG. 7 is a cross-sectional view taken along the line V13-V13 in FIG. 1 showing a state where the wire harness is in a preferable position in the vicinity of the vehicle body when opening and closing the slide door.

FIG. 7 is a view showing a state where the wire harness is located at a preferable position in the vicinity of the vehicle body at the time of opening and closing the slide door in a cross section taken along the line V13-V13 in FIG. 1.

As described above, in the portion of the wire harness 110 corresponding to the arm in the U shape on the vehicle body 60 side which becomes substantially U-shaped when the slide door 50 opens and closes, the curvature of the regulation direction D directed toward the inside of the vehicle body 60 is restricted by the curvature restricting member 130. The wire harness 110 whose curvature is regulated in this way as shown in FIG. 7 is positioned somewhat outside the step 61 of the vehicle body 60 together with the corrugated tube 120 and the curvature restricting member 130. As described above, in the present embodiment, the wire harness 110 is restrained from bulging toward the step 61 inside the vehicle body 60 when the slide door 50 opens and closes.

Further, in the present embodiment, in the plurality of member pieces 131 forming the curvature restricting member 130, the adjacent ones are in contact with each other on the side opposite to the connecting portion 132 when the curvature restricting member 130 is in a substantially linear state at, at least in the middle of the curvature restricting member 130.

In the power supply device 1, what approaches to the step 61 is a middle in the wire harness 110 when the slide door 50 opens and closes. According to the curvature restricting member 130 of the present embodiment, with respect to the portion along the middle of the wire harness 110, the curvature in the regulation direction D16 is made almost zero, allowing the bulging of the wire harness 110 as described above to substantially eliminate Further, in the present embodiment, the space between the plurality of member pieces 131 in the curvature restricting member 130, with substantially linear state not bending in the allowable direction D13 and the regulating direction D16, is set to be different between the portion in the vicinity of the body side holding part 150 and other parts. As a result, the limit state of the curvature restricting member 130 with respect to the curvature in the regulation direction D 16 differs at the above two positions on the arrangement direction of the plurality of member pieces 131. This makes the shape when the curvature restricting member 130 is curbed up to each limit state in the regulation direction D16 not a pure linear shape or a circular arc shape, but a shape as shown in FIG. 1 corresponding to the interval at each place. As described above, in the present embodiment, the shape when the curvature restricting member 130 is curbed to the limit state in the restriction direction D16 is made in the desired shape according to the installation condition of the wire harness 110 in the power supply device 1.

The shape when curbed to the limit state as described above is set arbitrary at the design stage depending on how to set the interval between the plurality of member pieces 131. For example, corresponding to the shape desired to be taken by the wire harness 110 (the shape shown in FIG. 1 in the present embodiment) when a force to bend in the regulation direction D16 is applied to the wire harness 110, the desired interval can be set at the design stage. In this manner, setting to the interval between the member pieces 131 at the design stage makes the shape when curbed to the respective limit state in the regulation direction D16 described above the desired shape.

Further, in the curvature restricting member 130 of the present embodiment, the plurality of member pieces 131 and the connecting portion 132 are molded integrally with each other. As a result, it is made unnecessary to assemble the curvature restricting member 130 or the like, reducing the manufacturing cost.

Further, in the curvature restricting member 130 of the present embodiment, each of the plurality of member pieces 131 is provided with a pair of opposed walls 1311 that face each other with the harness 110 interposed therebetween and a connecting wall 1312 connecting the pair of opposed walls 1311 to each other. As a result, each member piece 131 has a substantially C-shaped cross-sectional shape that intersects the longitudinal direction D17 of the wire harness 110. This makes, for example, the curvature restricting member 130 easily follow the wire harness 110 in such a fashion as to cover the wire harness 110 with each member piece 131 having a substantially C-shaped cross-section.

Here, in the present embodiment, as described with reference to FIG. 1, at the initial stage at a time of the opening of the slide door 50, the wire harness 110 is promptly formed into a U shape. Such a U shape is carried out by inducing the vehicle 5 away from the slide door 50 and in a direction opposite to the opening direction D 111. Therefore, a coil spring that urges the wire harness 110 separating from the slide door 50 and orienting in a direction opposite to the opening direction D 111 of the slide door 50 is provided with the door side holding part 140. However, the structure that urges the swing motion of the wire harness 110 at the initial stage of opening of the slide door 50 as described above is not limited to coil springs, but the following alternative structure is also conceivable.

Figure 8A:
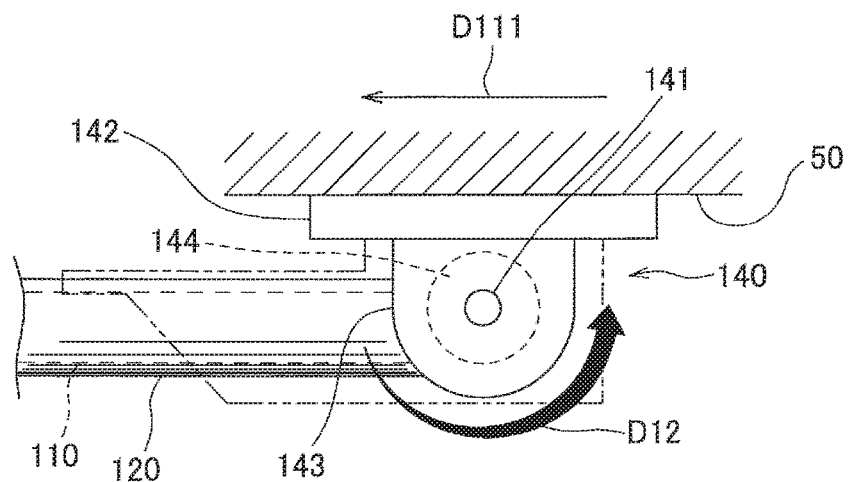
FIGS. 8A and 8B are schematic diagrams showing a structure for urging swing of the wire harness when the slide door is opened using a coil spring and another structure related thereto.
Figure 8B:
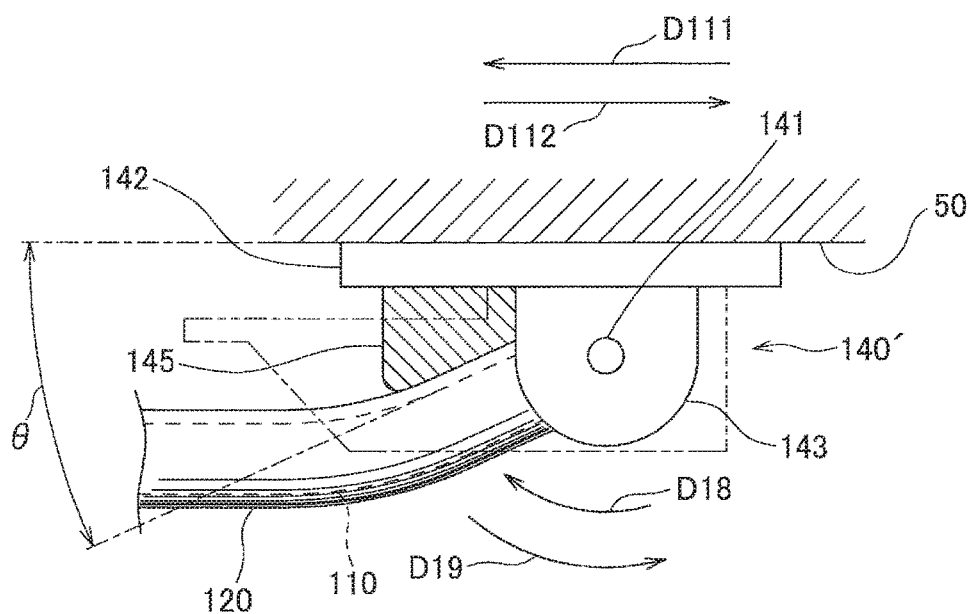

FIGS. 8A and 8B are views showing one structure of the swing of the wire harness when the slide door opens, using the coil spring or another structure. FIG. 8A is a schematic view showing the structure of the door side holding part 140 adapted in the power supply device 1 of the present invention. Further, FIG. 8B shows a schematic diagram showing the structure of the door side holding part 140' of another example. In FIG. 8B, the same elements as the door side holding part 140 of the present embodiment shown in FIG. 8A denote the same reference numerals as those in FIG. 8A.

First, as shown in FIG. 8A, the door side holding part 140 of the present embodiment has a slide fixing part 142 fixed to the door 50, and a swing portion 143 swingably supported around the door side swing shaft 141 in the fixing part 142 also shown in FIG. 1. The end portion of the corrugated tube 120 on the slide door 50 side covering the wire harness 110 is fixed to the swing portion 143, whereby the side of the wire harness 110 on the slide door 50 side is held on the swing portion 143. A coil spring 144 is provided around the door side swing shaft 141. This coil spring 144 allows the swing portion 143, that is, the wire harness 110 to be urged in an energizing direction D12 such as to move away from the slide door 50 and to be oriented in a direction opposite to the opening direction D111 toward the front side of the vehicle 5. This coil spring 144 urges the swing of the wire harness 110 in the direction D12.

On the other hand, in the door side holding part 140' of another example shown in FIG. 8B, the coil spring for biasing as described above is not provided. Instead, a restricting portion 145 for regulating the position of the wire harness 110 around the door side swing shaft 141 is provided. This restriction part 145 regulates the position on the front side of the opening direction D 111 of the slide door 50 around the door side swing shaft 141 as follows at the time of full open of the slide door 50. That is, the restriction part 145 regulates this position such that the wire harness 110 and the slide door 50 form an acute angle θ more than a predetermined angle about the door side swing shaft 141. This position regulation is performed when the slide door 50 is in the closing direction D112 by the restricting portion 145 regulating the swing of the wire harness 110 in the swing direction D18 at the position where the slide door 50 and the slide door 50 form the above acute angle θ.

In the door side holding part 140' of this alternative example, when the slide door 50 fully closes, the wire harness 110 and the slide door 50 form the acute angle θ around the door side pivot shaft 141, the wire harness 110 is inclined to some extent with respect to the slide door 50. As a result, when the slide door 50 opens, the wire harness 110 swings quickly in a direction D19 in which the inclination angle with respect to the vehicle body 50 opens, and becomes curbed in a substantially U-shape from the vehicle body 60 side towards the slide door 50 side. In such a wire harness 110, in conjunction with the regulation by the curvature restricting member 130 during the movement of the slide door 50, the linear shape of the portion on the side of the vehicle body 60 corresponding to one arm of the U shape is kept favorable. As a result, during movement of the slide door 50, the wire harness 110 to bulge toward the vehicle body 60 can be further regulated.

Further, in the door-side holding part 140' of this other example, quick swinging of the wire harness 110 as described above when the slide door 50 opens is restricted by the regulation in the restricting portion 145. Urging spring or the like is unnecessary for swinging the wire harness 110 in this way, and therefore the structure thereof can be simplified.

Thus, the explanation of the first embodiment of the present invention including the other example thereof ends, and then the description of the second embodiment of the present invention will be described.

In the second embodiment, the curvature restricting member differs from the curbed restricting member 130 of the above-described first embodiment. On the other hand, the structure and the like of the power supply device are the same as those of the power supply device 1 of the first embodiment. Therefore, hereinafter, the second embodiment of the present invention will be described focusing on the curvature restricting member, and the explanation describing the same points as the first embodiment such as the structure of the power supply device will be skipped.

Figure 9:
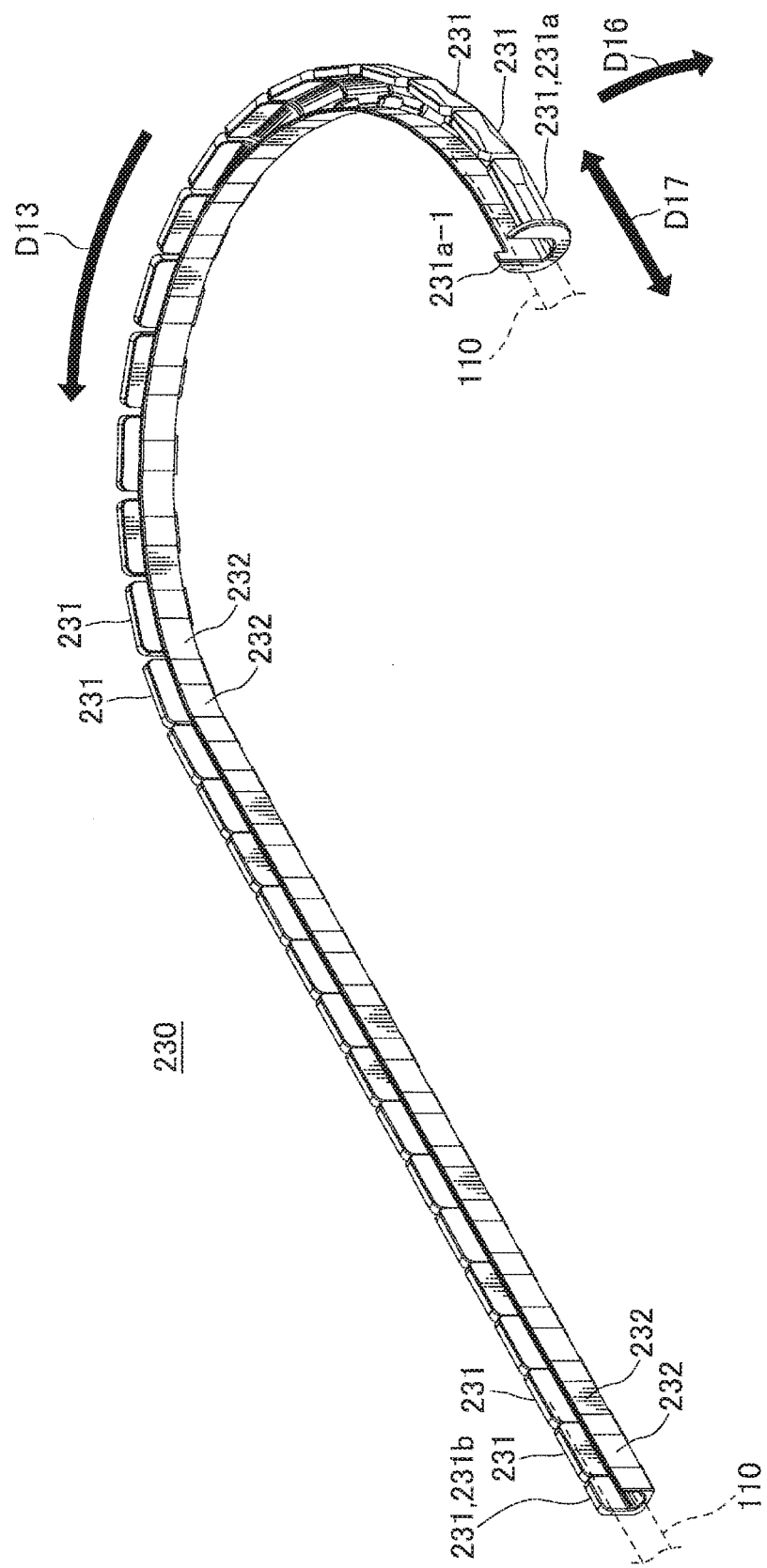
FIG. 9 is a view showing a curvature restricting member according to a second embodiment of the present invention.

FIG. 9 is a view showing a curvature restricting member according to the second embodiment of the present invention. Incidentally, in this FIG. 9, various kinds of directions or the like of wire harness and deformation of wire harness accompanying the opening and closing of the slide door are the same as in the first embodiment, and the same reference numerals as those shown in FIGS. 1 to 8 are denoted. Further, in the description of FIG. 9, various components such as a slide door equivalent to the first embodiment will be referred to especially regardless of figure number. This also applies to FIG. 10 to be referred to later.

Similarly to the first embodiment, the curvature restricting member 230 of the second embodiment is provided between the inner surface of the corrugated tube 120 and the wire harness 110 in a fashion surrounding the wire harness 110 in the circumferential direction. The curvature restricting member 230 has substantially the same length as the corrugated tube 120. In FIG. 9, the right end portion of the curvature restriction member 230 is the vehicle body 60 side, and the left end portion the slide door 50 side.

The curvature restricting member 230 includes a plurality of member pieces 231 arranged along the wire harness 110, and a connecting portion 232 that connects adjacent ones of the plurality of member pieces 231 to each other. Also in this embodiment, the plurality of member pieces 231 and the connecting portion 232 are integrally formed of resin. In FIG. 9, following the wire harness 110 curbed in the U shape curvature in the allowable direction D13 on the XY plane also shown in FIG. 1, the curvature restricting member 230 curbed in the same U shape is shown. The connecting portion 232 is a flexible member arranged along the wire harness 110 such as to lie inside the curbed shape at the time of curvature as such of the wire harness 110, that is, inside the curbed shape at the time of curvature in the allowable direction D13 as shown in FIG. 9.

Figure 10A:
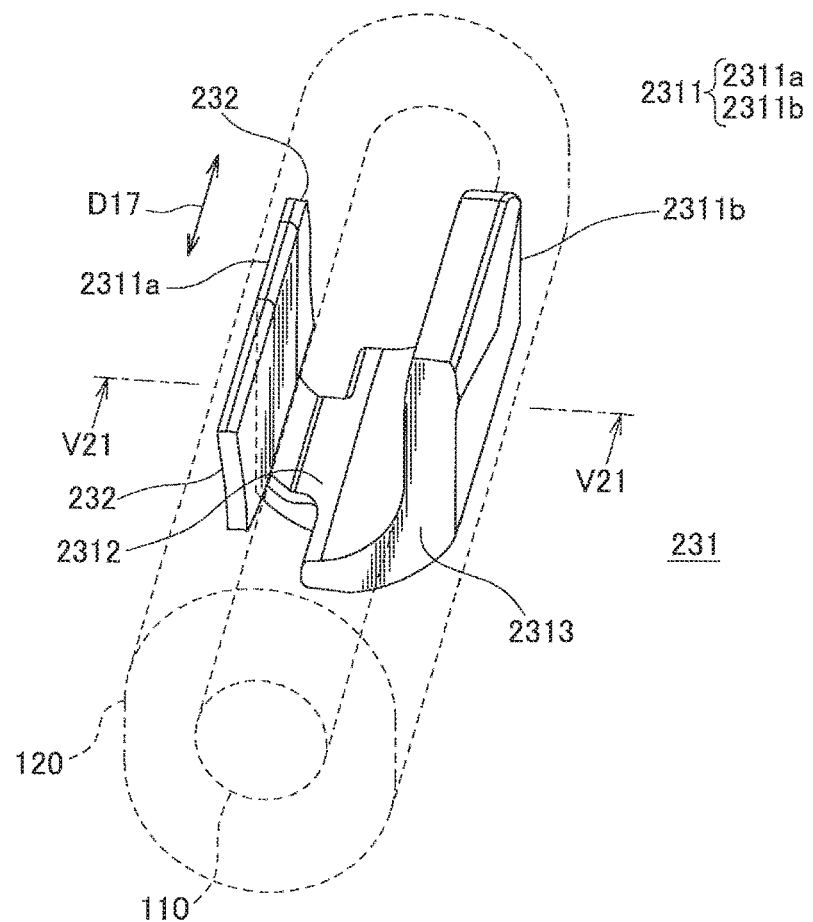
FIGS. 10A and 10B are views showing one typical example of the plurality of member pieces constituting the curvature restricting member shown in FIG. 9.
Figure 10B:
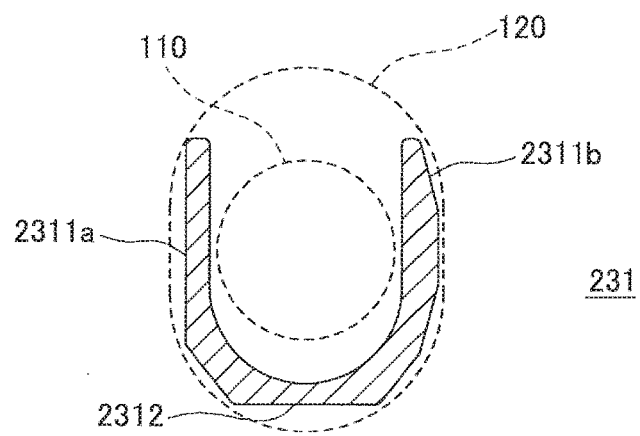

FIGS. 10A and 10B are views showing one of a plurality of member pieces constituting the curvature restricting member shown in FIG. 9. FIG. 10A is a perspective view of the member piece 231, and FIG. 10B shows a cross-sectional view showing a cross section taken along line V21-V21 in FIG. 10A.

As shown in the representative example in FIGS. 10A and 10B, each of the plurality of member pieces 231 includes a pair of opposed walls 2311 opposed to each other sandwiching the wire harness 110 therebetween, and a connecting wall 2312 connecting the pair of opposed walls 2311 to each other. Each of the member pieces 231 has the shape of the cross section that intersects with the longitudinal direction D17 of the wire harness 110 formed in a substantially C shape as shown in FIGS. 10A and 10B by the three walls.

One opposing wall 2311a of the pair of opposing walls 2311, as shown in FIG. 10A, is made a rectangular plate that is narrow in the length direction D17 of the wire harness 110 and thin. On the other hand, the other opposing wall 2311b is formed like a rectangular plate wide in the length direction D 17 and thick. One of the opposed walls 2311a faces a substantially central portion in the length direction D17 in the first direction 2311b in the other opposing wall 2311b.

The connecting wall 2312 connects a lower side of one opposing wall 2311 in the figure and a lower side of the other opposing wall 2311b in the figure. This connecting wall 2312 has a substantially T shape in a plan view when looked down from above. A portion of wire harness 110 corresponding to the T-shaped cross bar extending in the direction D 17 is formed wide, and a portion corresponding to the T-shaped vertical bar intersecting with the length direction D 17 is formed narrow and short. The narrow portion on the connecting wall 2312 is connected to the lower side of the above-mentioned one opposing wall 2311a in the figure, and the wide portion of the connecting wall 2312 is connected to the lower side in the figure in the other opposing wall 2311b.

In the present embodiment, the plurality of member pieces 231 are arranged along the wire harness 110 such that, in each member piece 231, the end face of the inverted L shape 2313 coupled continuously across the wide portion of the connecting wall 2312 from the opposing wall 2311b having a large wall thickness to the wide portion in the connecting wall 2312.

In the present embodiment, the member pieces 231 are arranged such that the narrow and thin opposed wall 2311a of the pair of opposing walls 2311 lies inside the curved shape of the curvature restricting member 230 shown in FIG. 9. The connecting portion 232 connects the narrow and thin opposed wall 2311a in the mutually adjacent member pieces 231 with each other. In addition, the connecting portion 232 is such a plate portion as shown in FIG. 10A, and is formed to be thin so as to be flexible enough to be bent any direction of the allowable direction D13 of FIG. 9 and the opposite direction thereof. In the present embodiment, the connecting portion 232 is formed to have the same thickness as the narrow and thin opposing wall 2311a.

Also in this embodiment, in the curved restricting member 230, the right end portion in FIG. 9 in the curvature restricting member 230, that is, the member piece 231a located at the end portion on the vehicle body 60 side is held on the vehicle body side holding portion 150 shown in FIG. 1 is held together with the end portion of the corrugated tube 120. On the other hand, in the curvature restricting member 230, the left end portion in FIG. 2, that is, the member piece 231b located at the end portion on the sliding door 50 side are not held by the door side holding portion 140 shown in FIG. 1. As shown in FIG. 9, this member piece 231a is provided with a flange 231a-1 for holding the flange 231a on the vehicle body side holding part 150. The holding structure of this flange 231a-1 is equivalent to the holding structure in the first embodiment shown in FIG. 4.

The curvature restricting member 230 of the second embodiment, also similar to the curvature restricting member 130 of the first embodiment, is bendable in the allowable direction D13 and unbendable in the restricting direction D16 on the side opposite to the allowable direction D13 beyond the limit state. This unbendable state is induced by the end face 2313 having an inverted L shape in the adjacent member piece 23 being in contact with each other when the wire harness 110 curves in the regulation direction D16. The curvature restricting member 230 of the second embodiment, similar to the restricting member 130 of the first embodiment, has the interval between the member pieces 231 different in two portions of a portion on the vehicle body 60 side and the other portion, and limiting conditions different from each other are set.

The curvature restricting member 230 may, even though replaced with the curvature restricting member 130 of the first embodiment, regulates the curvature bulging toward the inside of the vehicle body 60 in the restricting direction D16.

It is to be noted that the above-described embodiment merely shows a representative form of the present invention, but is not limited to this embodiment. That is, various modifications are made within a range not deviating from the gist of the present invention. Even with such deformation, the configuration of the curvature restriction member and the power supply device of the present invention, as long as including them, are included in the scope of the present invention.

For example, in the above-described embodiment, exemplified as an example of the curvature restriction member according to the present invention are the curvature restricting members 130 and 230 for inducing curvature of the wire harness 110 by accommodating the corrugated tube 120 together with the wire harness 110. However, the curvature restricting member referred to herein is not limited to this, and for example, what induces the curvature of the wire harness by fixing to the wire harness with a binding string, tie wrap or the like. In this case, the power supply device may be configured without using a corrugated tube.

Further, in the above-described embodiment, illustrated as an example of the curvature restricting member according to the present invention are the curvature restricting members 130 and 230 in which a plurality of member pieces 131, 231 is connected to each other by thin plate-like connecting portions 132, 232. However, the curvature restricting member referred to in the present invention is not limited thereto, and may be, for example, a bar shape in the shape of the connecting portion, and the physical shape does not matter.

Further, in the above-described embodiment, exemplified as an example of the curvature restriction member according to the present invention are the curvature restricting member 130 and 230 in which a plurality of member pieces 131, 231, and the connecting portions 132, 232 are integrally molded with a resin. However, the curvature restricting member referred to in the present invention is limited to this, but may be, for example, a plurality of member pieces made of resin and a flexible connecting portion composed of a metal plate spring are connected by screw fastening, adhesive fixing, insert molding, or the like.

In the above-described embodiment, exemplified as an example of the curvature restricting member according to the present invention, are the curvature restricting members 130 and 230 in which the intervals between the member pieces 231 are different in two places of a part and the other part of the vehicle body 60 side and limit states for curvature in the regulation direction D16 are different. However, the curvature restricting member according to the present invention is not limited to this, and for example, the interval of the member pieces 231 may be the same and one limit state may be set, or may be what differs in the limit states set at three or more places or the like. However, it is as described above that the curvature restricting member, that is, the curbed shape of the wire harness in the regulation direction of the wiring harness can be set to an arbitrary shape.

Further, in the above-described embodiment, exemplified as an example of the method of differentiating the limit state with respect to the curvature in the regulation direction D16 is the one of differentiating the interval of the member pieces 131 by differentiating the length of the plurality of member pieces 131 in the arrangement direction as shown in FIG. 6. However, the above method of differentiating the limit state is not limited to this, and a method in which the lengths of the pieces are the same, and the interval between the two is made different may be adopted. Regardless of the method, at the design stage, appropriate setting of the limit state at the two or more positions in the curvature restricting member makes the curbed shape of the curvature restricting member in the direction to be made into a desired shape.

In the above-described embodiment, exemplified as an example of a member piece according to the present invention, are member pieces 131 and 231 in which the cross section having the pair of opposite wall and the connecting wall becomes a substantially C-shaped. However, the member piece referred to in the present invention is not limited to this, and may be, for example, member piece with a substantially L-shaped cross section. The member piece referred to in the present invention does not matter in its specific shape if the adjacent ones are separated from each other when the wire harness bends in the allowable direction, and the wire harness comes into contact with each other when bent in the regulating direction.

DESCRIPTION OF SYMBOLS

1 power supply device
5 vehicles
50 slide door
60 car body
61 steps
110 wire harness
120 corrugated tube
130, 230 curvature restricting member
131, 311 member piece
1311, 2311 opposed wall
1312, 2312 connecting wall
132, 232 connection part
140, 140' door side holding part
141 door side swing shaft
142, 152 fixing part
143, 153 swinging section
144 coil spring
145 restriction part
150 car body side holding part
151 body-body side swing shaft
D11 opening and closing direction
D13 allowable direction
D16 regulation direction

What is claimed is:

1. A curvature restricting member, arranged along a wire harness so as to guide a curvature thereof, regulating the curvature on a predetermined plane, allowing such curvature as to bend the wire harness in a predetermined allowable direction on the plane, regulating such curvature as to bend the wire harness in a regulating direction opposite to the allowable direction beyond a predetermined limit state, the curvature restricting member comprising:

a plurality of member pieces configured to be arranged along the wire harness;

a flexible connecting portion located inside a curved shape formed by the plurality of member pieces when the plurality of member pieces is curved in the allowable direction, the connecting portion connecting adjacent ones of the plurality of member pieces to each other, wherein the curvature is allowed in the allowable direction by adjacent ones among the plurality of member pieces at a curved portion separating from each other on a side opposite to the connecting portion such that a distance in a direction corresponding to a length direction of the wire harness between the adjacent ones among the plurality of member pieces increases, and by the connection portion bending, and wherein the curvature is not allowed in the restricting direction beyond the limit state by adjacent ones among the plurality of member pieces at the curved portion abutting against each other on the side opposite to the connecting portion as a result of a decrease in the distance in the direction corresponding to the length direction of the wire harness between the adjacent ones among the plurality of member pieces.

2. The curvature restricting member according to claim 1, wherein a mutual interval between the plurality of member pieces differs in an arrangement direction with the member pieces not being curved in any one of the allowable direction and the restricting direction.

3. The curvature restricting member according to claim 1, wherein the plurality of member pieces and the connecting portion are molded integrally with each other.

4. The curvature restricting member according to claim 2, wherein the plurality of member pieces and the connecting portion are molded integrally with each other.

5. A power supply device electrically connecting a vehicle body and a slide door in a vehicle having the vehicle body and the slide door, the power supply device comprising:
- a wire harness arranged between the vehicle body and the slide door; and
- a curvature restricting member, disposed so as to guide a curvature along the wire harness, limiting a curvature on a plane intersecting the slide door and along an opening and closing direction of the slide door, allowing such curvature as to bend the wire harness in an allowable direction toward an outside of the vehicle body on the plane, regulating such curvature as to bend beyond a predetermined limit state the wire harness in a restricting direction toward an inside of the vehicle body on a side opposite to the allowable direction, wherein the curvature restricting member includes:
- a plurality of member pieces arranged along the wire harness, and
- a flexible connecting portion arranged inside a curved shape of the plurality of member pieces when curved in the allowable direction and connecting adjacent ones of the plurality of member pieces to each other, wherein in the allowable direction, adjacent ones among the plurality of member pieces at a curved portion are separated from each other on a side opposite to the connecting portion such that a distance in a length direction of the wire harness between the adjacent ones among the plurality of member pieces increases, and the connecting portion bends, and thereby the curvature restricting member is bendable, and wherein in the restricting direction, adjacent ones among the plurality of member pieces at the curved portion abut against each other on the side opposite to the connecting portion as a result of a decrease in the distance in the length direction of the wire harness between the adjacent ones among the plurality of member pieces, and thereby the bending restricting member is unbendable beyond the predetermined limit state.

6. The power supply device according to claim 5, further comprising:
- a door side holding part fixed to the slide door, holding swingably a part of the wire harness on the slide door side about a door side swing shaft crossing the plane;
- a vehicle body side holding part fixed to the vehicle body, holding swingably a part of the wire harness on the vehicle body side about a vehicle body side swing shaft crossing the plane; and
- a restricting portion regulating a position of the wire harness on a front side in an opening direction of the slide door around the door side swing shaft such that the wire harness and the slide door form an acute angle equal to or more than a predetermined angle around the door side swing shaft when the slide door fully closes.

* * * * *